United States Patent Office 3,801,637
Patented Apr. 2, 1974

3,801,637
COMPOUNDS OF 2',5' - SUBSTITUTED NITRO-
ANILIDES OF SUBSTITUTED NITROSALICYLIC
ACID
William H. Meek, Northfield, Ohio, assignor to
Ferro Corporation, Cleveland, Ohio
No Drawing. Continuation-in-part of application Ser. No.
186,514, Oct. 4, 1971. This application Aug. 1, 1972,
Ser. No. 277,075
Int. Cl. C07c *103/26*
U.S. Cl. 260—559 S                     9 Claims

ABSTRACT OF THE DISCLOSURE

A class of organic compounds is disclosed comprising substituted nitroanilides of 3-tert.-butyl-6-methyl-5-nitrosalicylic acid, characterized in that the anilide portion is nitrated in the 4' position and is further substituted only in either the 2' or 5' positions or in both the 2' and 5' positions. Moreover, the substituents themselves for the 2' and 5' positions must be selected from a small number of monovalent substituents. Such compounds are useful in the control of microorganisms and as insecticides. When the substituents for the 2' position are further restricted to a still, smaller selected number, the resulting compounds have markedly superior results as anthelmintics as compared to other compounds of the present invention, that is, therapeutic-agents for destroying parasitic life, such as intestinal worms.

CROSS-REFERENCE TO RELATED APPLICATIONS

This application is a continuation-in-part of an application entitled, "3-Tert.-Butyl-6-Methyl-5-Nitrosalicylic Acid, and Esters, and Amides Thereof," filed Oct. 4, 1971, and assigned Ser. No. 186,514. The parent application discloses and claims, among other compounds, substituted nitroanilides of the defined nitrosalicylic acid. Other related applications include: "Substituted Nitrosalicylanilides" Ser. No. 9,981, filed Feb. 9, 1970, now Pat. No. 3,666,808; "5-Chloro-4-Methyl-4'-Nitrosalicylanilide," Ser. No. 20,116, filed Mar. 16, 1970, now abandoned; "5-Chloro-4-Methyl-4'-Nitrosalicylanilide," Ser. No. 179,584, filed Sept. 10, 1971; and "Novel Anthelmintic Compound," Ser. No. 206,520, filed Dec. 9, 1971.

BACKGROUND OF THE INVENTION

The need for combating the growth of undesirable microorganisms, bacteria, insects, and the like is a continuing and increasing one. Many organic compounds have been suggested as a deterrent to such growth or as an effective destroyer of the undesired life.

As compared to a mere killing or destroying of microorganisms, etc., a quite different situation prevails when one is concerned with killing only one of two cohabiting classes of living things without harming the other. A common example of this is undesirable parasitic infestation on a desirable, living animal.

More specifically, various types of worm parasites are found in mammals of commercial importance to man. The most important are the parasites of livestock, especially of ruminants, such as sheep, goats, and cattle. However, other ruminants are similarly affected such as oxen, deer, water buffalo, etc. The more significant parasites are the nematodes of the alimentary tracts and the trematodes (flukes) which infect the liver. The alimentary tract nematodes are principally important insofar as they reduce the growth of the host animals and render less efficient the consumption of feed by the animals. The trematodes directly affect a vital organ and can cause severe illness and death in the host animal.

Obviously, a treating agent which not only kills the parasites, but also kills the host animal is of no utility. Conversely, a treating agent that is harmless on the host animal but only slightly retards the growth of parasitic life is of little real value. What is needed is a treating agent that not only efficiently kills or expels the parasites, but which is harmless to the host; or for which the host has a large margin of tolerance, that is, an agent of which the host can take massive dosages with little or no harm. Moreover, although both types of mentioned infestations, the nematodes and the trematodes, occur commonly and naturally in the same types of livestock, presently known medications normally used for control on one of these infections is generally ineffective for the control of the other.

The matter of tolerance of a host animal for a therapeutic agent, such as anthelmintic, cannot be overemphasized, especially when the animal must be administered to from a group or herd of animals in an unavoidable somewhat imprecise manner. In the treatment of large groups of animals, there is serious risk that some animals may be inadvertently treated more than once, and thus subjected to double or triple dosage; that some animals will be overdosed because of errors in estimating their individual weights; that some animals will, by virtue of individual genetic variation, and variable state of health or debility, have less tolerance than the average animal for any medication. It is therefore clearly desirable that the typical animal be able to tolerate without serious harm, as large a multiple as possible of the minimum dosage regarded as likely to be effective as an anthelmintic.

The difference in activity between an effective amount of an anthelmintic on parasites and on a host animal can be quantitatively expressed as a Therapeutic Index. This index is defined as the maximum dose at which no toxic symptoms in the host animals are observed, divided by the minimum dose at which the anthelmintic is therapeutically effective. In general, an anthelmintic is considered to be therapeutically effective against a given parasite when it kills or expells from the host at least 80% and preferable close to 100% of the viable forms of that parasite.

SUMMARY OF THE INVENTION

It has now been discovered that a class of compounds comprising substituted nitroanilides of 3-tert.-butyl-6-methyl-5-nitrosalicylic acid have particular utility as antimicrobial compounds, as insecticides, and for certain members of the class as anthelmintics against both nematodes and trematodes, when nitrated in the 4' position on the anilide moiety and when optionally substituted only in the 2' and/or 5' positions, and no other positions. Additionally, the substituents themselves must be selected from a rather limited class. Still further, when the substituents in the 2' position are reduced to an even more limited class, the resulting compounds make superior anthelmintics. The latter compounds are not only highly efficient in killing parasites but can be tolerated without harm by host animals in relatively large amounts.

A compound of the present invention has the general formula:

(I) 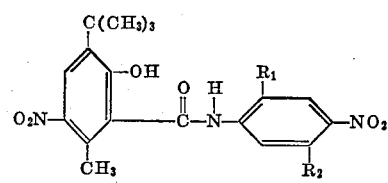

in which $R_1$ is hydrogen, alkyl of 1 to 4 carbon atoms, or alkoxy of 1 to 4 carbon atoms, and $R_2$ is hydrogen or methyl.

Compounds of the indicated formula are particularly effective as anthelmintics when $R_1$ is limited to methyl (when $R_2$ is also methyl) or methoxy as compared to the other defined compounds of Formula I.

DESCRIPTION OF THE PREFERRED EMBODIMENTS

Here and in the claims the following number system of salicylanilides is used:

(II)

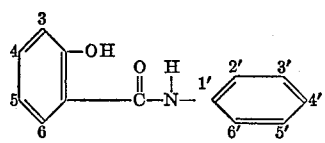

The salicylic acid portion of all compounds of the present invention have the same molecular configuration to afford the most useful compounds, namely, tert. butyl at the 3 position, nitro at the 5 position, and methyl at the 6 position. The anilide portion of all compounds of the present invention is nitrated at the 4' position and further substituted in either the 2' or 5' position, or in both the 2' and 5' positions, and at no other positions.

Additionally, the substituents at the 2', 5' positions must be selected from a relatively small group of monovalent substituents. As indicated, referring to the Formula I of the preceding section, $R_1$ must be hydrogen, alkyl of 1 to 4 carbon atoms, or alkoxy of 1 to 4 carbon atoms, and $R_2$ must be hydrogen or methyl. Anthelmintics of superior properties and performance are obtained when $R_1$ is restricted to methyl (when $R_2$ is also methyl) or methoxy.

Preparation of compounds of the present invention are described in the cited parent application, Ser. No. 186,514. In general, 3-tert.butyl-6-methylsalicylic acid may be nitrated in toluene solution with dropwise addition of nitric acid for about an hour at about 65° C. to about 70° C. Upon cooling, 3-tert.butyl-6-methyl-5-nitrosalicylic acid precipitates and may be recovered by filtration.

The nitroanilide of the described salicylic acid may then be formed by reaction with p-nitroaniline, preferably substituted at the 2 and 5 positions, as described above. The reaction may be carried out in chlorobenzene solution at 60° C. with dropwise addition of $POCl_3$ for about 15 minutes, followed by slowly heating the mixture to reflux temperature and maintaining the mixture at that temperature for about four hours until evolution of gas subsides. The resulting solution may be filtered while hot and then cooled to about 20° C. A precipitate forms of a substituted anilide of 3-tert.butyl-4', 5-dinitro-6-methylsalicylanilide which can be recovered by filtration. Example 1 illustrates in greater detail preparation of compounds of the present invention.

The new method of controlling helminths or parasitic worms by this invention comprises oral administration to a host animal, such as a ruminant animal in need of such treatment, combined with a pharmaceutical or a feed carrier, an effectively anthelmintic but nontoxic quantity of a compound of Formula I. These procedures are applicable both to gastrointestinal nematode infestations and to liver flukes infestations. However, other methods of administration of these compounds may be employed, for example, parenteral introduction of sterilized suspensions or solutions.

The administration is in quantities nontoxic but effective either for curative or prophylactic purposes and has broad range of activity on gastrointestinal parasites of warm blooded animals, especially sheep and cattle. The helminths most effectively treated with the new compounds are the trematodes and especially the nematodes.

Activity against flukes such as *Fasciola gigantica* or *Fasciola hepatica* is also particularly pronounced as noted above. More specific parasitic infestations in which this invention may be applied are found in the Merck Veterinary Manual, third edition, pages 699–806, as are general methods of control of internal parasites; see also U.K. Pat. No. 1,183,641. Generally effective doses range from about 1 up to about 50 mg./kg. of body weight, preferably about 5 to 25 mg./kg. Effective doses in sheep without significant side effects have been found to be about 1 to 50 mg./kg. Usually the dosage unit compositions are administered from 1 to 5 times daily. Preferably, for convenience, one treatment is used to clear the infection.

Veterinary or compositions containing sufficient quantities of the compounds of Formula I to reach the dose levels mentioned above are prepared as known to the art by preparing tablets, capsules, boluses, liquid suspensions, powders, drenches or solutions for injection in packaged form. Alternatively, especially for prophylaxis, premix or feed compositions containing effective but nontoxic quantities of the active salicylanilide are used. For these purposes particulate carriers, inert powders or, especially, feed carriers such as soybean meal, corn oil, vermiculite, diatomaceous earth, barley or wheat are used. In dosage unit or premix feed compositions the compound can comprise from about 5 to 75% of the final composition as is convenient for the farmer or veterinarian. As an example, A 5% salicylanilide-vermiculite or soybean meal premix can be used which will be uniformly mixed with the animal feedstuff.

To show the relative effect of compounds of the present invention differing in the $R_1$ and $R_2$ substituents of Formula I, as well as to show the relative effect of those compounds with respect to still other related compounds which are not of the present invention, that is, in which $R_1$ and $R_2$ are monovalent substituents other than those claimed, a series of tests were carried out on living animals as follows.

Procedure for controlled anthelmintic experiment in sheep naturally infected with gastrointestinal helminths Two groups of animals were used in the control trial. One group was used as non-medicated control; the other group was treated with a compound of the present invention. Egg counts were usually carried out before administration of the compound and seven days post-treatment, using a modified Stoll method hereinafter described.

The nametode ova were grouped into Strongyloides, Trichuris, Nematodirus and others such as Haemonchus, Trichostrongylus, Cooperia, Bunostomum, Oesophagostomum and Chabertia. The latter are difficult to separate with certainty.

The therapeutic regimen was given to the animals by drench (oesophageal gavage). All animals in the nontreated control, as well as the treated ones, were sacrificed 7 days post-treatment. The abdominal cavity of each animal was opened. The abomasum was separated from the omasum. The omasum and pyloric openings were tied, and the abomasum was dissected out and placed in a container. The small and large intestine were tied in the pyloric and ileocecal junctions and at the rectum. These tracts were dissected out and placed in separate containers. Each portion of the gastrointestinal tract was slit open and thoroughly washed with warm water. The tract was placed in a container with a sufficient amount of water and was incubated for several hours in Reinecke's tank at 42° C. These washings were then placed in plastic one-gallon jars. To the washings enough formalin was added to obtain a final concentration of 10%.

The worms of the abomasum and small intestine were counted from 1/10 aliquots. This aliquot was removed from the washing while the entire sample was in continuous motion. The 1/10 aliquots must be taken from the middle of the jar. The aliquots were placed in a sieve #200 (74μ opening) and then washed thoroughly with running water so that the formalin was removed. The worms and the coarse particulate matter which remained on the surface of the sieve were washed into a beaker with tap water from a squeeze bottle.

The aliquots thus prepared were examined by placing small amounts into an intergrid Petri dish, which then were transferred under a dissecting microscope. All worms present were recovered and transferred into glycerine alcohol until identification. The large intestinal washings were strained using a sieve #60 (250μ opening). All worms present were removed and placed in a glycerine alcohol solution until identification.

The number of worms recovered from the 1/10 aliquot were multiplied by 10 to find the total number of worms in the abomasum and small intestine. The large intestinal worms were counted in their entirety. Relative anthelmintic activity for each nematode genus was calculated from the relation:

Relative anthelmintic activity =

$$\frac{\text{Average worm count in untreated animals} - \text{Average worm count in treated animals}}{\text{Average worm count in untreated animals}} \times 100$$

Procedure for egg count Haemonchus contortus experiment in sheep

Helminth-free young lambs were infected with about 10,000 filariform larvae of H. contortus. In 3 weeks, the infection became patent, egg counts were made to determine the density of the worm burden.

The egg count was carried out using the following modified Stoll method. Three grams of sheep feces were taken rectally from each animal and placed in the Stoll flask. To each flask, tap water was added to the top line. The fecal pellets were emulsified using a narrow tongue depressor. If the pellets were too hard to break down, the flasks were closed with rubber stoppers and kept in the refrigerator for several hours. The flasks were thoroughly shaken and a 1 ml. sample was transferred to an 8 ml. plastic tube, to which enough saturated sodium chloride solution was added to reach the rim. The tubes thus prepared were centrifuged for ten minutes at 1500 r.p.m., then sodium chloride solution was added with a medicine dropper to form a concave miniscus. A cover glass (22 x 22) was carefully added and the tubes were kept in a refrigerator for ten to twenty minutes. During this period, the nematode ova flowed upward and adhered to the bottom of a cover slip. At the end of the 20-minute period, the cover slip was carefully detached from the miniscus and tranferred to the microscopic slide. The ova were counted under a microscope equipped with 10× objective lens. Each ovum under the microscope represented 20 ova in the samples.

Animals with sufficiently high egg counts were taken out of the pool and housed in experimental pens. In this controlled experiment two groups of animals were used. One group was treated with salicylanilides at 15 mg./kg. of animal weight. The other group served as untreated control. Since the salicylanilides are water insoluble, they were first ground using a mortar and pestle and then placed in a carboxymethyl cellulose solution. The particles were then further micronized ultrasonically. The compound was administered to 2 or 3 animals by Oesophageal gavage. Control untreated animals received only the carboxylmethyl cellulose solution in a similar manner. On the 6th and 7th day after treatment, fecal pellets were taken from the rectum of the control as well as the treated animals and egg counts made.

Procedure for evaluating compounds against *Fasciola hepatica*

Eggs of *Fasciola hepatica* were collected from the bile of donor sheep. The eggs were embryonated and snails were infected (the genus Lymnae served as intermediate host) to produce metacercaria which are the infective forms for sheep. Each sheep was infected with 250 metacercariae intraruminally. When the infection became patent in about 80 days, egg counts were carried out to determine the degree of worm burden. The experimental procedure for evaluating antifluke compounds was similar to the controlled anthelmintic experiment in which the liver was processed to recover *F. hepatica* in the untreated and treated sheep.

The following examples illustrate the present invention and should not be construed as imposing limitations upon the claim. Percentages are by weight unless otherwise indicated.

Although certain of the present compounds are uniquely adapted for use as anthelmintics, all of the compounds find use in other general applications in which undesirable parasitic or infecting life is destroyed. The following Example 1 illustrates preparation of compounds of the present invention; Examples 2 through 4 illustrate applications of the present compounds other than as anthelmintics; Example 5 illustrates the use of the compounds as a sheep drench; Example 6 describes the preparation of a ruminant bolus; Examples 7 through 14 and 18 provide results of the present compounds when used as anthelmintics; Examples 15 through 17 provide results of the present compounds when used to combat liver flukes; Example 19 illustrates the importance of the precise location of the substituents; and Examples 20 through 23 provide physical data of some of the present compounds.

EXAMPLE 1

Preparation of 2',5' substituted nitroanilides of substituted nitrosalicylic acid In a glass reaction vessel equipped with internal stirrer, 104 parts of 3-tert.butyl-6-methylsalicylic acid were mixed with 520 parts of toluene at 60° C. Next, 108 parts of aqueous nitric acid (35% HNO$_3$) were added dropwise over the course of one hour with constant stirring. With the temperature held by external heating at 65–70° C. and stirring continued, the reaction was continued for another hour. The mixture was then cooled to 0–10° C. and the precipitated product was separated from supernatant liquor by filtration. After the product was washed with heptane, a yield of 68.1 parts of 3-tert.butyl-6-methyl-5-nitrosalicylic acid was obtained (M.P. 205–6° C., decomp.).

The nitrosalicylanilide of the salicylic acid was then prepared as follows: A reaction vessel equipped with internal stirrer, thermometer, external heater, valved liquid inlet and reflux condenser was charged with the following materials:

| | Parts |
|---|---|
| 3-tert.butyl-6-methyl-5-nitrosalicylic acid | 253 |
| p-Nitroaniline | 138 |
| Chlorobenzene | 1107 |

The mixture was stirred and heated to 60° C. and 51 parts of POCl$_3$ were added dropwise during one-quarter hour. Then the constantly stirred mixture was slowly heated to reflux and maintained for about four hours until evolution of gas subsided. The resulting solution while still hot was filtered and then cooled to 20° C. A crystalline prepicitate formed which was recovered by filtration, washed with cold methanol and recrystallized from toluene. A yield of 224 parts (60%) of 3-tert.butyl-4',5-dinitro-6-methylsalicylanilide was obtained (M.P.

205–7° C.). Elemental analysis resulted in the following data:

Percent C—Calcd.—58.00; found—58.26
Percent H—Calcd.—5.10; found—5.14
Percent H—Calcd.—5.10; found 5.14
Percent N—Calcd.—11.24; found—11.26

The infrared absorption spectrum was consistent with the expected structure of the molecule.

By an analogous procedure, using an appropriately substituted analine, the following compound of the invention was prepared: 3-tert.butyl-2',6-dimethyl-4',5-dinitrosalicylanilide M.P. 153–156° C.

Other compounds of the present invention can be similarly prepared, for example, from 2-methoxy-4-nitroaniline; 2-ethyl-4-nitroaniline; and 2,5 dimethyl-4-nitroaniline.

EXAMPLE 2

A compound of Formula I in which $R_1$ was methyl and $R_2$ was hydrogen was tested as an antibacterial compound at a concentration of 0.5 p.p.m. of the compound in an inert carrier. This compound completely inhibited the growth of *Staphylococcus aureus* in nutrient agar media. A concentration of 2 p.p.m. of the same compound in an inert medium completely inhibited the growth of *Haemophilus gallinarum*.

The following procedure for antibacterial evaluation was used. The test compound was dissolved in a suitable solvent (typically dimethyl sulfoxide or acetone) and incorporated in a nutrient agar at test concentration. Plates were then streaked with cultures of the appropriate bacterium. The inoculum contained about $8 \times 10^8$ organisms per milliter. After incubation for 48 hours at 37° C., plates were examined for evidence of growth of the microorganism.

EXAMPLE 3

When the same compound of Example 1, $R_1$ being methyl and $R_2$ being hydrogen, was distributed over a cornfield at the rate of 8 pounds per acre, the compound completely inhibited development of corn virus disease. The same compound was also active as an insecticide against the southern army worm.

EXAMPLE 4

When $R_1$ and $R_2$ of Formula I were hydrogen, the resulting compound had important bacteriostatic properties. The compound was completely inhibitory at 4 p.p.m. to the growth of *Streptococcus foetidus*; at 2 p.p.m. to *Haemophilus gallinarum*; and at 0.5 p.p.m. to *Staphylococcus aureus*.

The same compound was significantly effective (73% and 100% on replicate tests) when used a 2 p.p.m. in an inert carrier against the fungus, *Phytophthora infestans*, which is responsible for late blight in tomatoes. The compound was 58% effective when used at 4 p.p.m. against the fungus, *Alternaria solani*, which is responsible for early blight in tomatoes. The compound was active as a preemergent herbicide for broadleaved plants.

EXAMPLE 5

Sheep Drench

| | Parts by weight |
|---|---|
| 3-tert.butyl-4'-5-dinitro-2'-methoxy-6-methylsalicylanilide | 20 |
| Terra alba | 75.5 |
| Tragacanth | 3.0 |
| Sodium lauryl sulfate | 1.5 |

The above solid components are mixed to give a water-dispersible powder to be used on concentrations of 5 g. of powder to 5 ml. of water. The drench is used orally as necessary and practical to control gastrointestinal infections.

EXAMPLE 6

Ruminant bolus

| | Grams |
|---|---|
| 3-tert.butyl-4',5-dinitro-2',5',6-trimethylsalicylanilide | 0.4 |
| Calcium phosphate | 4.0 |
| Maize starch | 0.54 |
| Talcum | 0.14 |
| Gum arabic | 0.15 |
| Magnesium stearate | 0.05 |

The phosphate and salicylanilide are mixed and screened, and then granulated using one-half the starch. The screened and dried granules are mixed with the remaining ingredients, blended thoroughly, and compressed on a bolus press.

Similarly, tablets can be prepared with reduced fillers.

EXAMPLES 7 THROUGH 14

The results of tests on sheep in a manner described, supra, using compounds of the present invention are given in Table I, Examples 6 through 12.

TABLE I

| Example: | Substituents | | Haemonchus, percent (15, mg./kg.) | Tolerance (mg./kg.) |
|---|---|---|---|---|
| | $R_1$ | $R_2$ | | |
| 7 | $OCH_3$ | H | 100 | >100 |
| 8 | $CH_3$ | $CH_3$ | 100 | >15, <50 |
| 9 | H | H | Toxic | |
| 10 | $NO_2$ | H | 0 | |
| 11 | Cl | H | Toxic | |
| 12 | $CH_3$ | H | Toxic | |
| 13 | $OCH_3$ | $OCH_3$ | 0 | |
| 14 | Cl | Cl | 0 | |

The numbers in the column "Haemonchus—Percent (15 mg./kg.)" refer to percent of parasites destroyed or expelled when the indicated compound was introduced into the rumen of sheep at a dosage of 15 milligrams per kilogram of body weight. The values under "Tolerance (mg./kg.)" refer to the highest test dosage in milligrams of anthelmintic per kilogram of body weight at which the sheep developed no toxic symptoms.

The broken line extending across Table I separates compounds of the invention which are superior anthelmintics from certain other compounds of the invention which are not recommended for use as anthelmintics but which are useful in other applications (note other examples).

Thus, it will be noted that when $R_1$ and $R_2$ were methoxy and hydrogen, respectively (Example 7), this the compound of Formula I not only was 100% effective in destroying or expelling *Haemonchus contortus*, but the compound was tolerated without harmful effect by the host animal in an amount exceeding 100 milligrams per kilogram of body weight. When $R_1$ and $R_2$ were both methyl (Example 8), the resulting compound also had an efficiency of 100% in destroying or expelling *Haemonchus* and was tolerated in an amount greater than 15 milligrams per kilogram of body weight but less than 50 milligrams per kilogram, still a most accepted tolerance.

On the other hand, when $R_1$ and $R_2$ were as indicated by Examples 9 through 14, the resulting compounds either had no efficiency with respect to *Haemonchus contortus* or, at the dosage indicated, were toxic. The tolerances of the compounds of Examples 9 through 14 as anthelmintics were accordingly not determined since they would be meaningless.

While the compounds of Examples 9, 11, and 12 could be effective as anthelmintics at dosages less than 15 milligrams per kilogram of body weight, their use for this purpose is not recommended. However, the same compounds do have other beneficial properties as shown by the following Table II.

EXAMPLES 15 THROUGH 17

The compounds of the present invention are also effective against liver flukes as illustrated by their effectiveness against the genus *Fasciola hepatica* as shown by the following Table II.

TABLE II

| Example: | Substituents $R_1$ | $R_2$ | Minimum effective dose (mg./kg.) against fasciola |
|---|---|---|---|
| 15 | H | H | 1 |
| 16 | $CH_3$ | $CH_3$ | 10 |
| 17 | $OCH_3$ | H | 5.15 |

The values in the right hand column show the lowest dosage at which the compounds were completely effective in eliminating liver flukes.

As noted, when $R_1$ and $R_2$ were methoxy and hydrogen, respectively (Example 7), the resulting compound is a superior anthelmintic. The same compound (Example 17) is also effective against *Fasciola hepatica*. However, while a compound having $R_1$ and $R_2$ both as hydrogen is a poor anthelmintic (Example 9), it is excellent against *Fasciola hepatica* (Example 15), requiring only one milligram per kilogram of body weight for an effective dose.

EXAMPLE 18

The compound in which $R_1$ is methoxy and $R_2$ is hydrogen also effective against many other nematode parasites in addition to *Haemonchus contortus* in ruminant alimentary canals. Thus, in naturally parasitized six month only sheep treated with 15 milligrams per kilogram of body weight of this compound, the average reduction in number of forms as compared to untreated animals is indicated in the following Table III:

TABLE III

| Microorganism: | Percent |
|---|---|
| *Haemonchus contortus* | 93 |
| Ostertagia | 87 |
| Trichostrongylus (from abomasum) | 85 |
| Strongyloides | 92 |
| Cooperia | 67 |
| Bunostomum | 100 |
| Oesophagostomun | 100 |

The relatively low level of infection in the control rendered the measurement of efficacy somewhat uncertain in the case of the last two mentioned genera.

EXAMPLE 19

It is important to note that the precise location of the substituents of the present compounds is critical to the invention. For example, when methoxy is in the 2' position, nitro is in the 4' position, and hydrogen is in the 5' position using the numbering system previously given, the compound is 100% effective against *Haemonchus contortus* at 15 milligrams per kilogram of body weight (Table I, Example 7). However, when the positions of the nitro and methoxy groups are reversed, the effectiveness of the resulting compound at the same dosage drops to 49%.

EXAMPLE 20 THROUGH 23

Th following Table IV provides physical characteristics including color and melting points of some of the compounds of the present invention. These compounds are solids and were prepared by the process described herein. The compounds are identified by their $R_1$ and $R_2$ substituents in accordance with Formula I.

TABLE IV

| Example: | Substituents $R_1$ | $R_2$ | Color | Melting point, °C. |
|---|---|---|---|---|
| 20 | H | H | Yellow | 204 to 205. |
| 21 | $CH_3$ | H | do | 157 to 158. |
| 22 | $OCH_3$ | H | do | 204 to 206. |
| 23 | $CH_3$ | $CH_3$ | Light tan | 167 to 168. |

While the foregoing describes several embodiments of the present invention, it is understood that the invention may be practiced in still other forms within the scope of the following claims.

I claim:

1. A compound consisting essentially of a nitroanilide of 3-tert.butyl-6-methyl-5-nitrosalicylic acid having the formula:

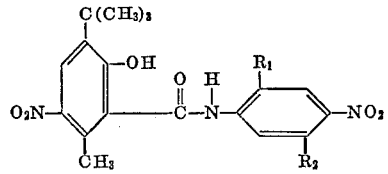

in which $R_1$ is hydrogen, alkyl of 1 to 4 carbon atoms, or alkoxy of 1 to 4 carbon atoms, and $R_2$ is hydrogen or methyl.

2. A compound consisting essentially of a nitroanilide

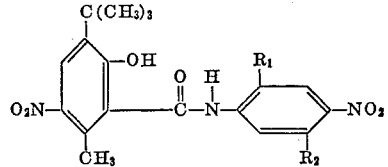

in which $R_1$ is methyl or methoxy, and $R_2$ is hydrogen or methyl, provided that $R_1$ is methyl only when $R_2$ is methyl.

3. A compound of claim 2 in which $R_1$ is methoxy.
4. A compound of claim 2 in which $R_2$ is hydrogen.
5. A compound of claim 2 in which $R_2$ is methyl.
6. The compound of claim 1 comprising 3-tert.butyl-4',5-dinitro-2'-methoxy-6-methylsalicylanilide.
7. The compound of claim 1 comprising 3-tert.butyl-4',5-dinitro-6-methylsalicylanilide.
8. The compound of claim 1 comprising 3-tert.butyl-2',6-dimethyl-4',5-dinitrosalicylanilide.
9. The compound of claim 1 comprising 3-tert.butyl-4',5-dinitro-2',5',6-trimethylsalicylanilide.

References Cited

UNITED STATES PATENTS 3,674,849  7/1972  Darlington et al.  260—559

HARRY I. MOATZ, Primary Examiner

U.S. Cl. X.R.

424—324